Figure 5:
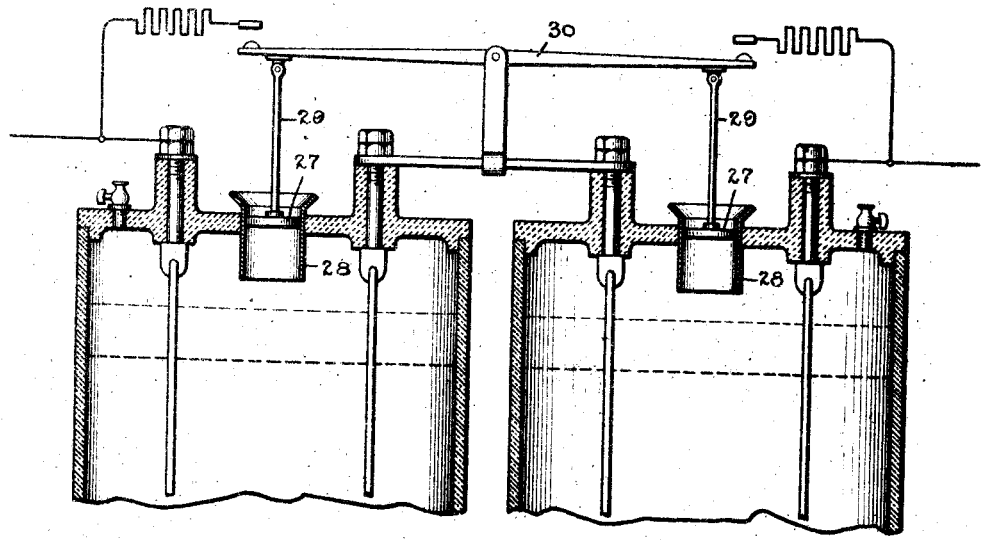

E. E. F. CREIGHTON.
REGULATING RESISTANCE FOR ELECTROLYTIC CONDENSERS.
APPLICATION FILED APR. 23, 1909.
1,029,344.
Patented June 11, 1912.
3 SHEETS—SHEET 1.
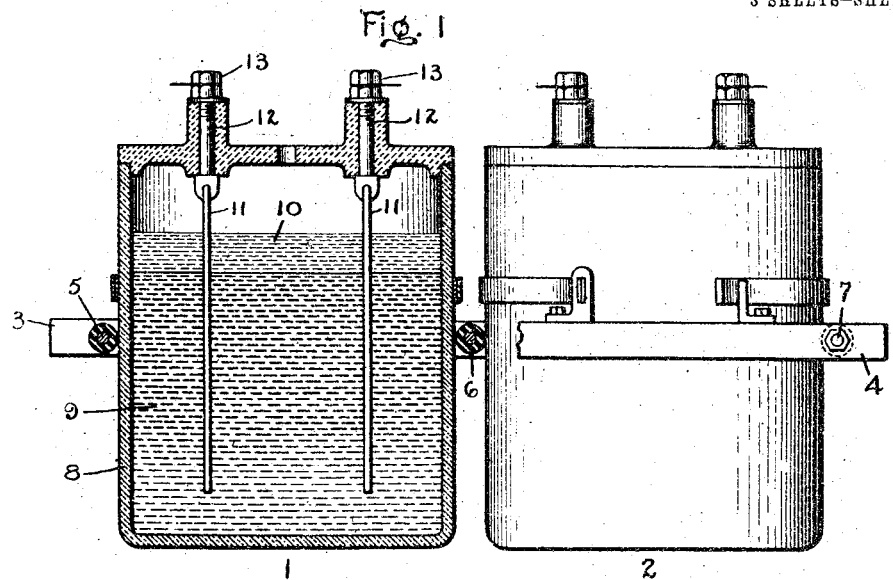
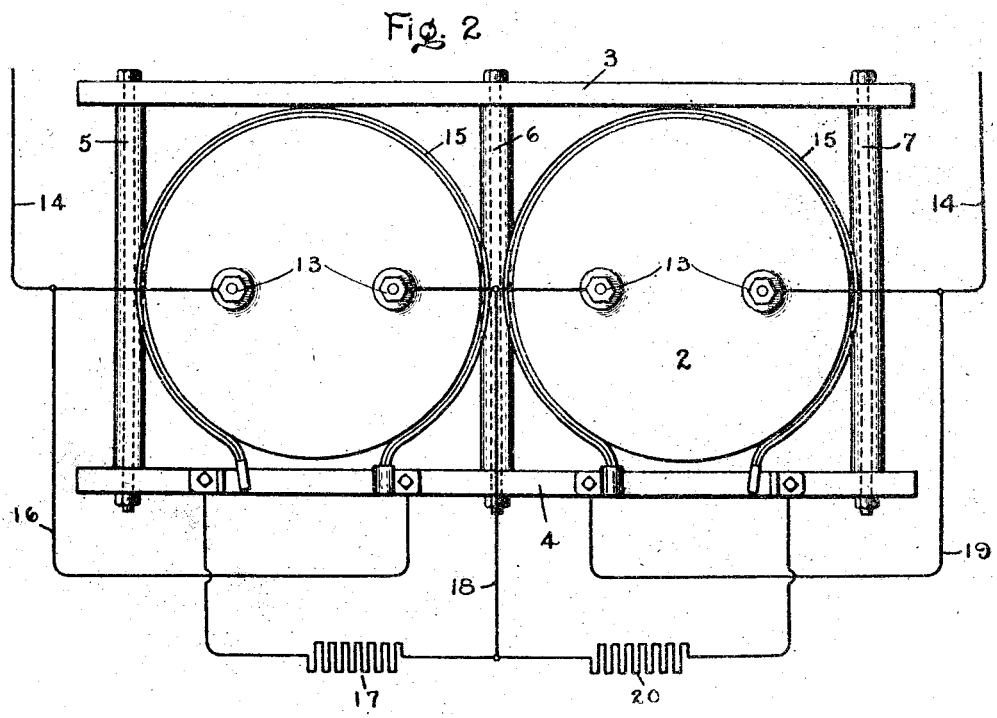
WITNESSES:
Lester H. Fulmer
J. Ellis Glen
INVENTOR
ELMER E. F. CREIGHTON.
BY
ATT'Y.

E. E. F. CREIGHTON.
REGULATING RESISTANCE FOR ELECTROLYTIC CONDENSERS.
APPLICATION FILED APR. 23, 1909.
1,029,344.
Patented June 11, 1912.
3 SHEETS—SHEET 2.
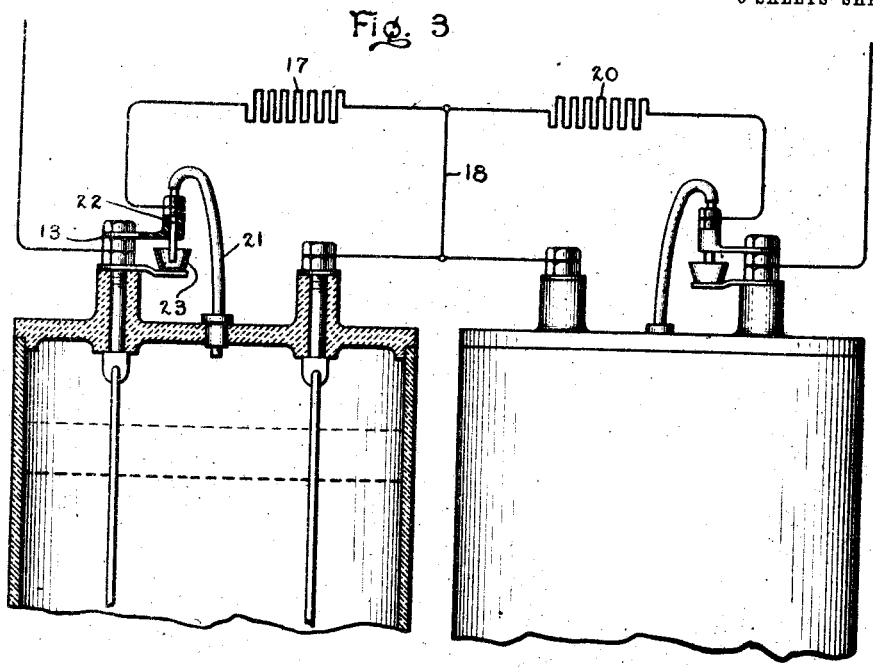
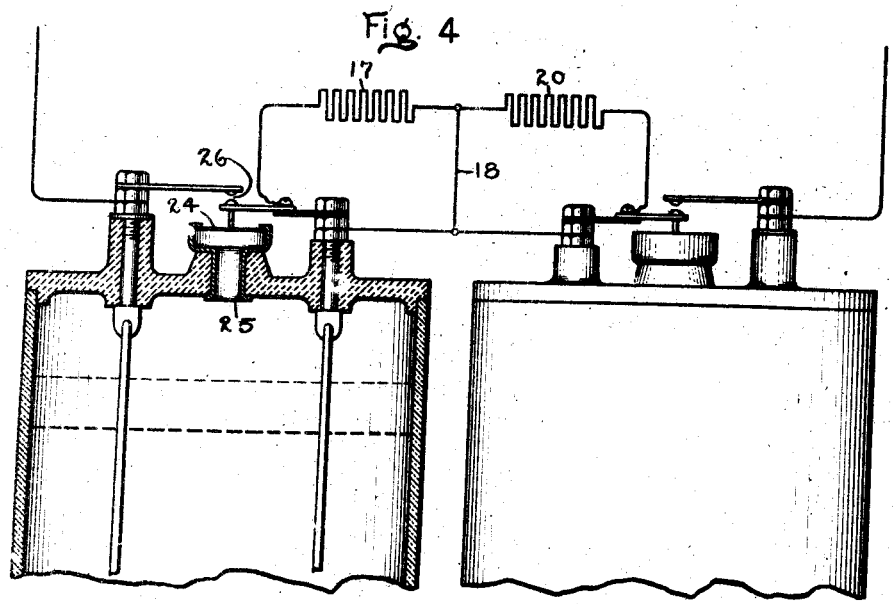
INVENTOR
ELMER E. F. CREIGHTON E. E. F. CREIGHTON.
REGULATING RESISTANCE FOR ELECTROLYTIC CONDENSERS.
APPLICATION FILED APR. 23, 1909.

1,029,344.

Patented June 11, 1912.

3 SHEETS—SHEET 3.

WITNESSES:

INVENTOR
ELMER E. F. CREIGHTON
BY
ATT'Y.

UNITED STATES PATENT OFFICE.

ELMER E. F. CREIGHTON, OF SCHENECTADY, NEW YORK, ASSIGNOR TO GENERAL ELECTRIC COMPANY, A CORPORATION OF NEW YORK.

REGULATING RESISTANCE FOR ELECTROLYTIC CONDENSERS.

1,029,344.

Specification of Letters Patent. Patented June 11, 1912.

Application filed April 23, 1909. Serial No. 491,713.

*To all whom it may concern:*

Be it known that I, ELMER E. F. CREIGHTON, a citizen of the United States, residing at Schenectady, county of Schenectady, State of New York, have invented certain new and useful Improvements in Regulating Resistance for Electrolytic Condensers, of which the following is a specification.

My invention relates to the use of a plurality of electrolytic condenser cells, which are connected in series across the line of a transmission system for the purpose of protecting the lines from lightning or equalizing surges and other disturbances in said lines.

As electrolytic condensers are now well understood in the art only a brief description will be required at this point. The cell consists essentially of aluminum electrodes immersed in a suitable electrolyte, such as ammonium tetraborate. When a cell of this kind is included in an electric circuit a thin film of aluminum oxid or hydroxid is formed on the surface of these plates, which exerts an insulating action and almost completely prevents the flow of current after its formation. However, when the voltage impressed upon the cell exceeds a certain "critical voltage", the insulating property of the film is broken down and the additional flow of current is opposed only by the resistance of the electrolyte. It has been found that when a number of such cells are connected in series that the critical voltage will not be the same for each cell, even though the electrodes and the electrolyte for each cell be made identical as far as possible. It will sometimes happen that the film of one or more of the cells in a series of this kind becomes deteriorated to such an extent that the cells will no longer take their share of the impressed voltage. This, of course, will throw an excessive strain on the remaining cells. The result will often be that most of the excess voltage will be taken by a few cells, or, even by one cell, which results in undue heating of these cells or cell, leading to a further break-down on account of this excessive strain. In this manner one cell after another becomes deteriorated until all the cells are destroyed one after another.

According to my invention, I provide a device for each of the cells, which will automatically complete a high resistance shunt around any particular cell when its temperature rises above a certain predetermined limit, thereby diverting a part of the current from the overloaded, and hence overheated cell. When normal conditions have been restored the cell cools off and the shunt circuit is automatically opened.

My invention comprises several embodiments of automatic means for accomplishing this end, which will be described in detail hereinafter.

Figure 6:
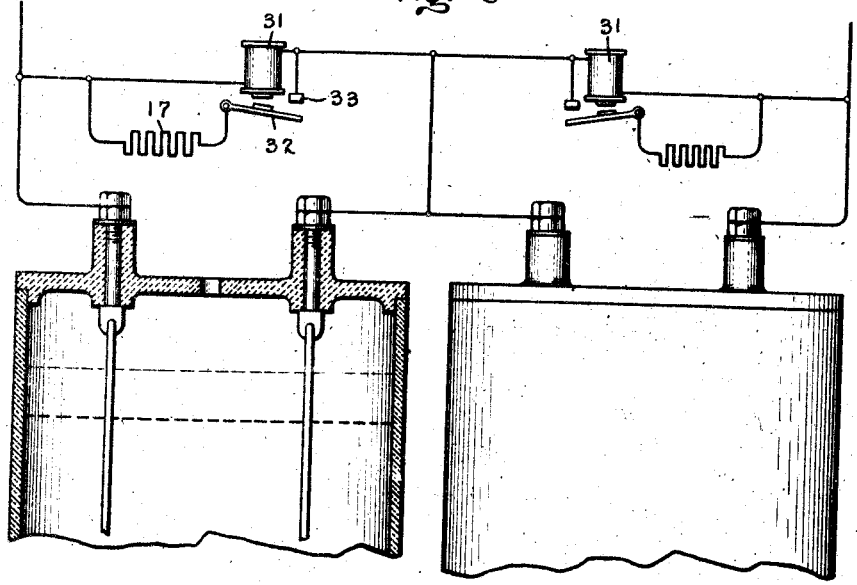

Figure 1 is an elevational view, partly in section, of a pair of cells equipped with a thermostat for closing the shunt circuit; Fig. 2 is a plan view of the same cells, and also shows a diagram of circuits; Fig. 3 is a fragmental view, partly in section, showing two cells equipped with an arrangement for completing the shunt circuit by condensing the vapors arising from the overheated cell, the circuit being completed through the condensed liquid; Fig. 4 shows an arrangement for utilizing the pressure of the gases in the overheated cell to complete the circuit; Fig. 5 illustrates a similar arrangement for using the gaseous pressure to close the shunt circuit; and Fig. 6 is a fragmental view, partly in section, showing two cells equipped with an electromagnetic switch for completing the shunt around the overloaded cell. In each case but two cells have been shown connected in series; but it will be apparent that the same arrangement can be used with any number of cells.

In Figs. 1 and 2 the cells 1, 2 are shown as rigidly clamped together by means of strips 3, 4 and tie rods 5, 6, 7. As shown in Fig. 1, the cells consist of a suitable container 8 filled with an electrolyte 9, above which is placed a layer of oil 10 to prevent evaporation. The electrodes, consisting of aluminum plates 11, are suspended from the cover by means of supporting lugs 12. Electrical connections are made with the electrodes by means of nuts 13. As is clearly shown, the cells are connected in series across the conductors 14. Around each cell in close contact with the same is placed a curved thermostat 15, which forms part of the shunt circuit, which for cell 1 consists of conductor 16, the regulating resistance 17 and conductor 18; in cell 2 of conductor 19, regulating resistance 20 and conductor 18. The amount or regulating resistance in the shunt circuit will depend upon conditions, but will at least equal and usually much exceed the ohmic resistance of the cell with which it is in parallel. As clearly shown, the thermostat 15 is rigidly attached to one of the supporting strips at one end, the other end being left freely movable. Ordinarily the contact between the thermostat and the conductor of the shunt circuit is broken. If the temperature of the cell rises above a predetermined limit, contact is made by the thermostat completing the high resistance shunt circuit across the cell, thus relieving it from the extraordinary strain. As already explained above, when normal conditions have been restored contact is again broken, placing the cell again in service.

The arrangement of circuits in the arrangement illustrated by Fig. 3 is identical with that illustrated by Fig. 2. The modified arrangement is used for completing the circuit when one of the cells becomes excessively overheated. The tube 21, which consists of any suitable material, as rubber, communicates with the interior of the cell at one end and at its other end is attached to a small metallic tube 22, which is electrically connected with one branch of the shunt circuit, as clearly shown. It is conveniently supported from the terminal 13 of the cell, but is insulated therefrom. The end of the tube 22 projects into a small metallic cup 23, which is in electrical contact with one terminal of the cell. When a cell becomes unduly overheated, some of the escaping vapors condense and the cup 23 becomes filled with liquid, completing the shunt circuit around the cell through conductor 18 and the resistance 17, thereby relieving the cell from excessive strain, as already explained in connection with Figs. 1 and 2. When normal conditions have been restored, and the cell cools off the small amount of liquid in cup 23 is evaporated, thereby opening the shunt circuit.

As illustrated in Fig. 4, the shunt circuit around the cell is completed by the pressure of gasses evolved in the event of the cell becoming overheated. The pressure is exerted upon a diaphragm 24, which is stretched across a tubular extension 25 in the cover of the cell. As clearly illustrated in the figures, the pressure of gases in the interior of the cell by raising the diaphragm will close the contact 26 and complete the shunt circuit around the cell.

A similar arrangement is illustrated in Fig. 5; but in this case the pressure of gas is exerted upon the piston 27 sliding in a cylinder 28 fixed in the cover of the cell. The piston is attached to a rod 29, the rods 29 of two adjacent cells being rigidly connected by a pivoted lever 30. When a pair of cells is used with an arrangement of this kind the shunt circuit around one cell must always be open. In other respects the electrical connections and arrangements of parts illustrated by this figure is the same as illustrated in Fig. 1.

As illustrated in Fig. 6, according to one modification of my invention an electromagnet 31 is permanently connected across the cell, as clearly shown. When an unusual load is thrown upon the cell the potential across its terminals rises, electromagnet 31 becomes energized, and it attracts the armature 32. This closes the contact 33, thereby completing the shunt circuit around the cell through the resistance 17. When normal conditions have been restored the electromagnet will become weakened, due to a drop of potential across the cell, and the shunt circuit will open.

Although in the above examples but two cells have been shown as a matter of illustration, it will, of course be understood that any number of cells can be similarly used.

What I claim as new and desire to secure by Letters Patent of the United States, is,—

1. The combination with an electrolytic condenser cell, a shunt circuit around said cell, and a regulating resistance for said cell in said circuit, of thermostatic means mounted in thermal relation to said cell and responsive to the temperature of said cell for maintaining said shunt circuit closed when the temperature of said cell is abnormal and for opening said shunt circuit when the temperature of the cell again becomes normal.

2. The combination with a plurality of electrolytic condenser cells connected in series of thermostatic means mounted in thermal relation to said cell and responsive to an abnormal temperature of said cells for automatically completing a high resistance shunt circuit around any of said cells and for opening said shunt circuit as the temperature of said cells becomes normal.

3. The combination with an electrolytic condenser cell, of a high resistance shunt circuit around said cell, and thermostatic means mounted in thermal relation to said cell for closing and then opening said shunt circuit as the temperature of said cell becomes abnormal and then returns to normal.

4. The combination with a plurality of electrolytic condenser cells, of thermostatic means mounted in thermal relation to said cell for completing and then opening through a regulating resistance a shunt circuit around any one of said cells when its temperature rises above a predetermined point and then again falls to said point.

5. The combination with a condenser cell comprising two electrodes, of a high resistance shunt circuit between said electrodes, and thermostatic means in thermal relation to the wall of said cell and responsive to temperature of said wall for closing said shunt circuit when said temperature is abnormal and for opening said circuit as the temperature again becomes normal.

6. The combination of a plurality of electrolytic condenser cells, a normally open shunt circuit containing a regulating resistance and connected around each of said cells, and means responsive to the temperature of each cell for automatically closing the shunt circuit around the cell when the temperature of the cell exceeds a predetermined point and automatically opening the shunt circuit when the temperature falls below said point.

In witness whereof, I have hereunto set my hand this 21st day of April, 1909.

ELMER E. F. CREIGHTON.

Witnesses:
BENJAMIN B. HULL,
HELEN ORFORD.